United States Patent
Nakamura

(10) Patent No.: US 9,232,197 B2
(45) Date of Patent: Jan. 5, 2016

(54) ENDOSCOPE APPARATUS AND METHOD FOR RELEASING HEAT GENERATED BY IMAGING ELEMENT OF THE ENDOSCOPE APPARATUS

(75) Inventor: Kazuhiko Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 155 days.

(21) Appl. No.: 13/247,141

(22) Filed: Sep. 28, 2011

(65) Prior Publication Data
US 2012/0075446 A1   Mar. 29, 2012

(30) Foreign Application Priority Data
Sep. 29, 2010   (JP) ................................ 2010-220072

(51) Int. Cl.
H04N 7/18   (2006.01)
(52) U.S. Cl.
CPC .................................... *H04N 7/183* (2013.01)
(58) Field of Classification Search
CPC .... H04N 7/183; A61B 1/122; A61B 1/00163; A61B 1/00066
USPC ......................................................... 348/65
See application file for complete search history.

(56) References Cited

U.S. PATENT DOCUMENTS

| | | | |
|---|---|---|---|
| 6,017,337 A * | 1/2000 | Pira ................................ | 606/20 |
| 2005/0114068 A1* | 5/2005 | Chey et al. .................... | 702/130 |
| 2006/0012275 A1* | 1/2006 | Kiss et al. ..................... | 313/113 |
| 2008/0100732 A1* | 5/2008 | Minamio et al. .............. | 348/294 |
| 2008/0177144 A1* | 7/2008 | Otawara ........................ | 600/157 |
| 2009/0315986 A1* | 12/2009 | Ohara ............................. | 348/65 |
| 2010/0201794 A1 | 8/2010 | Kido et al. | |
| 2011/0046440 A1* | 2/2011 | Asada et al. .................. | 600/104 |

FOREIGN PATENT DOCUMENTS

| | | |
|---|---|---|
| CN | 101808569 A | 8/2010 |
| JP | 2002-344095 A | 11/2002 |
| JP | 2003-10111 A | 1/2003 |
| JP | 2009-82503 A | 4/2009 |
| JP | 2010-69217 A | 4/2010 |

OTHER PUBLICATIONS

Office Action dated Oct. 22, 2013 issued by the Japanese Patent Office in counterpart Japanese Patent Application No. 2010-220072.

(Continued)

Primary Examiner — Jay Patel
Assistant Examiner — Joseph Suh
(74) Attorney, Agent, or Firm — Sughrue Mion, PLLC

(57) ABSTRACT

An endoscope apparatus includes an imaging element, a flexible substrate, and a flexible heat release sheet. The imaging element is built in an endoscope front end portion so as to receive incident light from a subject. The imaging element and components of a circuit for driving the imaging element are mounted on the flexible substrate and the flexible substrate is built in the endoscope front end portion. The flexible heat release sheet includes a first region attached to a given region of the imaging element other than a light receiving surface of the imaging element and a second region thermally contacted to a heat release member disposed in the endoscope front end portion.

13 Claims, 8 Drawing Sheets

(56) References Cited

OTHER PUBLICATIONS

Office Action dated Jun. 5, 2014 issued by the State Intellectual Property Office of P.R. China in corresponding Chinese Application No. 201110303555.X.

Office Action dated Dec. 9, 2014, issued by the State Intellectual Property Office of P.R. China in counterpart Chinese Application No. 201110303555.

Office Action dated Apr. 10, 2015, issued by the State Intellectual Property Office of P.R. China in counterpart Chinese Application No. 201110303555.X.

* cited by examiner

ENDOSCOPE APPARATUS AND METHOD FOR RELEASING HEAT GENERATED BY IMAGING ELEMENT OF THE ENDOSCOPE APPARATUS

CROSS-REFERENCE TO RELATED APPLICATIONS

This application claims the benefit of Japanese Patent Application No. 2010-220072 (filed on Sep. 29, 2010), the entire contents of which are hereby incorporated by reference.

BACKGROUND

1. Technical Field

The present invention relates to an endoscope apparatus having a front end portion in which an imaging element is built, and a method for releasing heat generated by the imaging element.

2. Related Art

When an electronic apparatus is assembled, generally, a flexible substrate is used for enhancing the degree of freedom of the assembling. When such a flexible substrate is used, the flexible substrate is bent at any place so that the electronic apparatus is easily assembled in a narrow site easily.

For example, in an electronic endoscope apparatus described in JP-A-2010-69217, an imaging element is mounted on a flexible substrate so that the imaging element can be assembled in a narrow endoscope front end portion easily.

A structure which releases heat well is required for receiving an imaging element, a circuit for driving the imaging element, or the like in a narrow endoscope front end portion. The imaging element may be a heat generating element. In the electronic endoscope apparatus described in JP-A-2010-69217, a part of the flexible substrate is used as a heat release portion.

In recent electronic endoscope apparatuses, the diameter of a front end portion to be inserted into a subject is about 1 cm, and the diameter has a tendency to decrease. Further, there is a request to shorten the length of the front end portion. In addition, there is a tendency to increase the number of pixels in an imaging element and to increase the driving frequency to improve the image quality of a captured image.

The imaging element is a heat generating component. With increase in the number of pixels in the imaging element, the heat value of the imaging element increases. In addition, when the imaging element is driven at a high speed, the heat value of the driving circuit also increases. It is therefore necessary to build a structure with further improved heat release characteristic in an electronic endoscope apparatus which receives the imaging element in the endoscope front end portion. However, when the endoscope front end portion is reduced in diameter and shortened in length, the imaging element and a flexible substrate mounted with the imaging element needs to be miniaturized. Thus, it is difficult to secure a path to release heat generated by the imaging element.

JP-A-2002-344095 has disclosed a technique in which a graphite layer with high heat conductivity is laminated on the surface of a resin layer of a flexible substrate in order to enhance heat release performance of the flexible substrate. However, when the graphite layer with high heat conductivity is laminated on the flexible substrate, the thickness of the flexible substrate itself increases so that the flexible substrate cannot be received in a narrow site.

In addition, an electronic endoscope apparatus according to JP-A-2003-10111 has used a structure in which a large GND terminal region of a signal cable connected to an imaging element is secured so that heat generated by the imaging element can be released to the signal cable through the GND terminal. However, only with the heat release structure according to JP-A-2003-10111, there is a fear that satisfactory heat release characteristic cannot be obtained when an imaging element which has a larger number of pixels and is driven at a higher speed is received in an endoscope front end portion having a smaller diameter.

SUMMARY OF INVENTION

An object of the invention is to provide an endoscope apparatus having a structure with high heat release performance, and a method for releasing heat generated by an imaging element of the endoscope apparatus.

According to an aspect of the invention, an endoscope apparatus includes an imaging element, a flexible substrate, and a flexible heat release sheet. The imaging element is built in an endoscope front end portion so as to receive incident light from a subject. The imaging element and components of a circuit for driving the imaging element are mounted on the flexible substrate and the flexible substrate is built in the endoscope front end portion. The flexible heat release sheet includes a first region attached to a given region of the imaging element other than a light receiving surface of the imaging element and a second region thermally contacted to a heat release member disposed in the endoscope front end portion.

According to another aspect of the invention, a method for releasing heat generated by an imaging element of an endoscope apparatus includes an attaching step, a contacting step, and a transmitting step. The endoscope apparatus includes the imaging element and a flexible substrate. The imaging element is built in the endoscope front end portion so as to receive incident light from a subject. The imaging element and components of a circuit for driving the imaging element are mounted on the flexible substrate and the flexible substrate is built in the endoscope front end portion. In the attaching step, a first region of a flexible heat release sheet is attached to a given region of the imaging element other than a light receiving surface of the imaging element. In the contacting step, a second of the flexible heat release sheet region is thermally contacted to a heat release member disposed in the endoscope front end portion. In the transmitting step, heat generated by the imaging element is transmitted to the heat release member through the flexible heat release sheet.

According to the invention, a wire for sending a signal to a processor outside an endoscope is connected to a substrate mounted with an imaging element, so that a heat release path from the substrate to the signal wire is formed. In addition, one side of a heat release sheet is pasted onto a back surface side of the imaging element directly or through another member, while the opposite side of the heat release sheet is pasted onto a heat release member. Accordingly, heat generated by the imaging element can be released through another path than the heat release path through the substrate. Thus, the performance for releasing heat of the imaging device is enhanced. It is therefore possible to drive the imaging element at a higher speed.

DETAILED DESCRIPTION

An exemplary embodiment of the invention will be described below with reference to the drawings.

Figure 1:
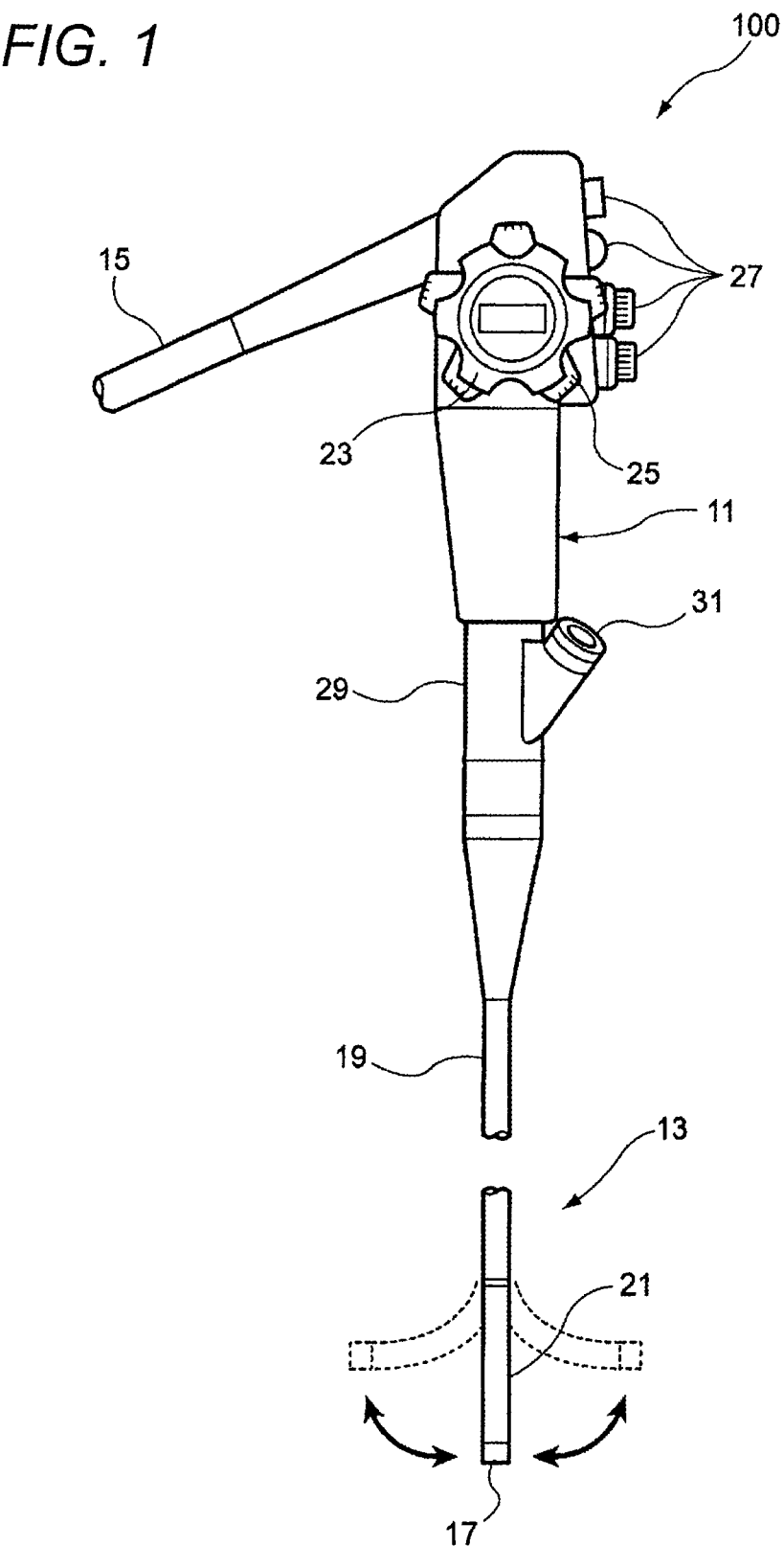
FIG. 1 is an overall configuration view of an endoscope apparatus according to an exemplary embodiment of the invention.

FIG. 1 is an overall configuration view of an endoscope apparatus according to an exemplary embodiment of the invention. An endoscope apparatus 100 has a body operation portion 11 and an endoscope insertion portion 13 which is provided consecutively to the body operation portion 11 and which will be inserted into a body cavity. A universal cable 15 is connected to the body operation portion 11, and a not-shown connector is provided at a front end of the universal cable 15. The connector is removably coupled with a not-shown light source device, by which illumination light is sent to an illumination optical system in a front end portion 17 of the endoscope insertion portion 13. In addition, a video connector is also connected to the connector. The video connector is removably coupled with a processor for carrying out image signal processing or the like.

The endoscope insertion portion 13 is constituted by a soft portion 19, a curved portion 21 and the front end portion 17 in order of increasing distance from the body operation portion 11. The curved portion 21 can be remotely operated to be curved by rotating angle knobs 23 and 25 of the body operation portion 11. Thus, the front end portion 17 can be directed in a desired direction.

In addition to the angle knobs 23 and 25, various buttons 27 such as an air-supply/water-supply button, a suction button, a shutter button, etc. are provided side by side in the body operation portion 11. In addition, a connection portion 29 extended toward the endoscope insertion portion 13 has a forceps insertion portion 31. An operative instrument such as forceps inserted from the forceps insertion portion 31 is led out from a forceps port 33 (see FIG. 2) formed in the front end portion 17 of the endoscope insertion portion 13.

Figure 2:
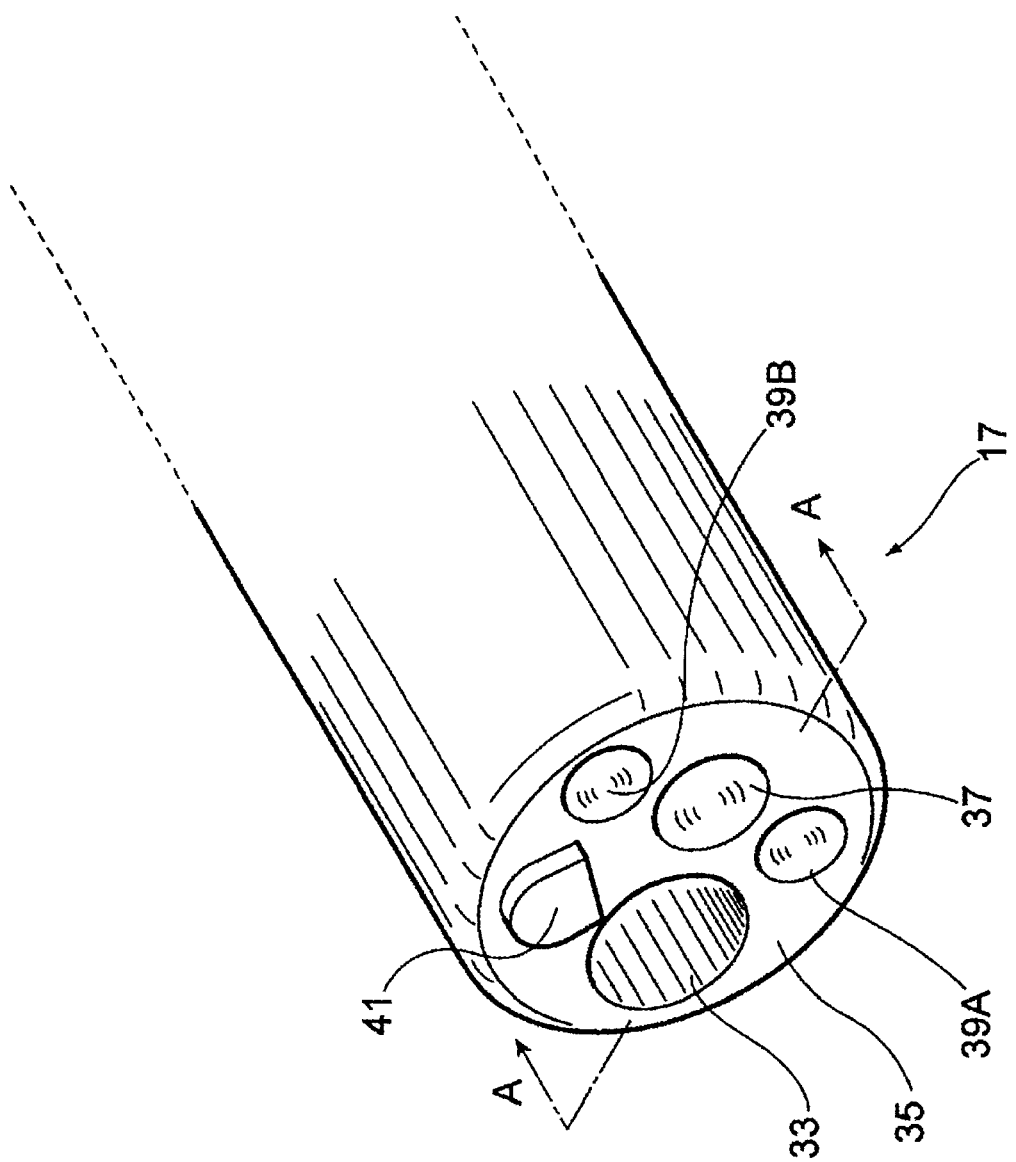
FIG. 2 is an external view of a front end portion of the endoscope apparatus shown in FIG. 1.
Figure 3:
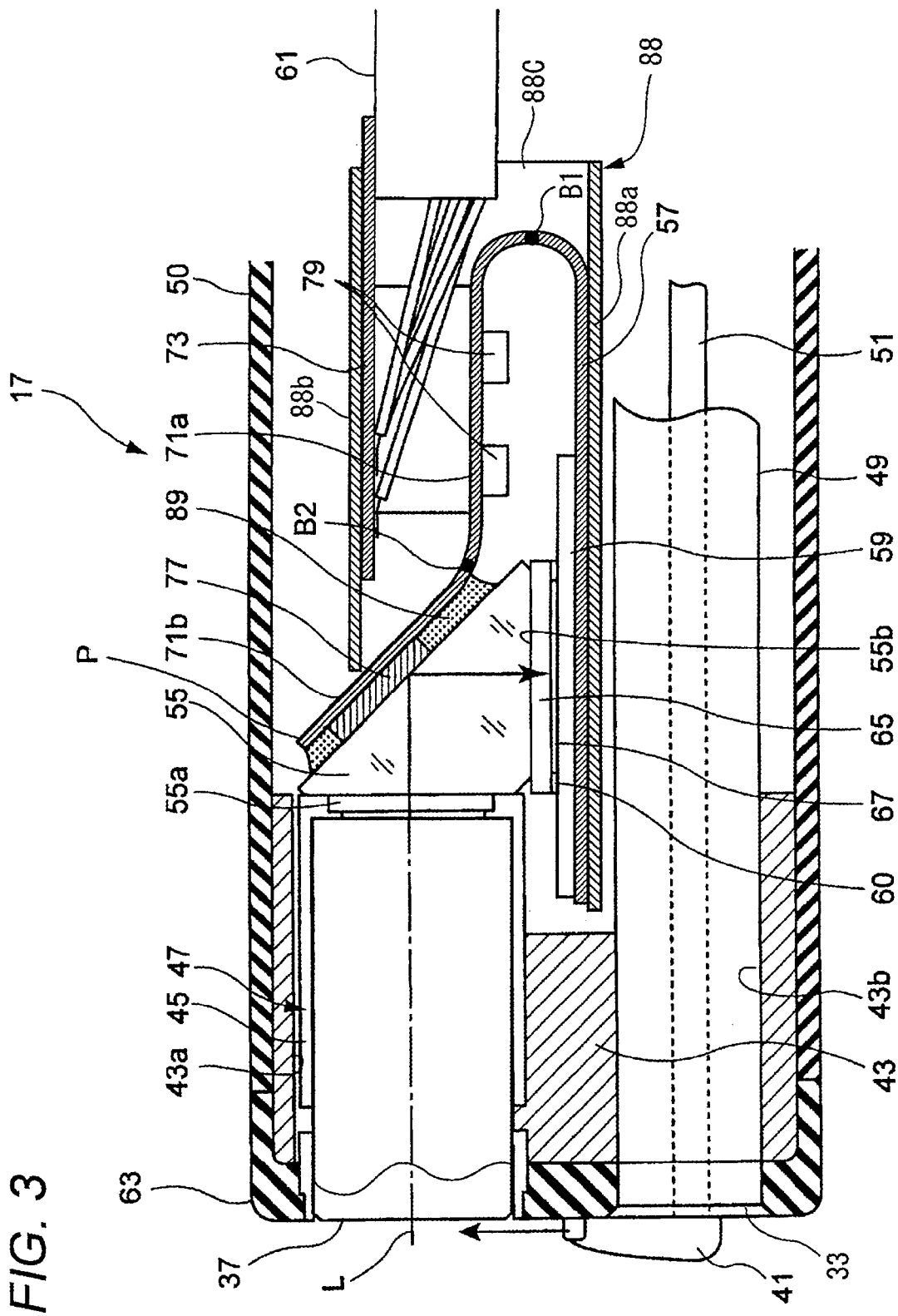
FIG. 3 is a sectional view taken on line A-A in FIG. 2.

FIG. 2 is a perspective view of the front end portion of the endoscope insertion portion. FIG. 3 is a sectional configuration view taken on line A-A in FIG. 2. As shown in FIG. 2, an observation window 37 of an imaging optical system and irradiation holes 39A and 39B of an illumination optical system provided on opposite sides of the observation window 37 are disposed in a front end surface 35 of the front end portion (hereinafter also referred to as endoscope front end portion) 17 which is the front end portion of the endoscope insertion portion 13. The forceps port 33 is disposed near the observation window 37 and the irradiation holes 39A and 39B. Further, a nozzle 41 for supplying air and water to the observation window 37 is disposed so that an ejection port of the nozzle 41 is directed toward the observation window 37.

As shown in FIG. 3, the endoscope front end portion 17 has a front end hard portion 43 made from a metal material such as a stainless steel material, an imaging device 47 fixed with a lens tube 45 inserted through a drilled hole 43a formed in the front end hard portion 43, and a forceps pipe 49 (whose front end opening serves as the forceps port 33) made from metal and disposed in another drilled hole 43b. In addition, the endoscope front end portion 17 receives an air-supply/water-supply duct 51 connected to the nozzle 41, and various members connected to the illumination optical system, such as not-shown light guides for guiding light.

In the imaging device 47, an optical path L of incident light imported from a subject through the observation window 37 and passed through a not-shown objective lens group received in the lens tube 45 is changed at right angles by a triangular prism 55 and formed as an image on an imaging element 59 mounted on a flexible substrate 57. Then, an image signal based on image information of the subject imported into the imaging element 59 is outputted to a signal cable 61 through the substrate 57. The signal cable 61 will be described later.

The imaging optical system including the objective lens group in the lens tube 45, the triangular prism 55 and the imaging element 59 is disposed inside a housing of the endoscope front end portion 17 so as to serve as the imaging device 47. In addition, the illumination optical system is constituted by optical members such as lenses disposed in the irradiation holes 39A and 39B (see FIG. 2) and light guides connected to the optical members. These optical members and light guides are also disposed inside the housing of the endoscope front end portion 17. Image information outputted from the imaging element 59 is transmitted to the aforementioned processor through the signal cable 61 so as to be processed as an image for display.

A not-shown metal sleeve is fitted on an outer circumference of the front end hard portion 43. Not-shown nodal rings disposed in the curved portion 21 (see FIG. 1) are connected to the metal sleeve so that the nodal rings can be curved. An outer circumference of the metal sleeve is covered with a jacket tube 50, and a front end side of the front end hard portion 43 is covered with a front end cover 63. The jacket tube 50 and the front end cover 63 are tightly connected to each other so as to prevent water from entering the inside.

The objective lens group in the lens tube 45 is connected to an entrance-side end surface 55a of the triangular prism 55, and a cover glass 65 serving as a translucent protective substrate is bonded to an exit-side end surface 55b of the triangular prism 55. The imaging element 59 is disposed on an opposite side of the cover glass 65 to the triangular prism 55, while an air gap 67 is interposed between the imaging element 59 and the cover glass 65. The air gap 67 is set to have a predetermined volume by a frame 60 disposed around the imaging element 59.

The substrate 57 mounted with the imaging element 59 is folded back in a first bending axis B1 in FIG. 3. Further, the substrate 57 is bent in a second bending axis B2 so as to extend upward from a horizontal plane illustrated in FIG. 3 and along a total reflection slope (hereinafter referred to as slope simply) of a prism outer surface serving as a total reflection surface of the triangular prism 55. Thus, the substrate 57 presses against the slope of the triangular prism 55. Here, the triangular prism is used as an optical member for guiding light to the imaging element 59 by way of example. The optical member is not limited to the triangular prism, but an optical path changing member having another shape and another system may be used. In addition, the material of the cover glass 65 is not limited to a glass material, but may be another material such as a transparent resin as long as it has translucency with respect to observation light.

In the aforementioned endoscope apparatus 100 according to the exemplary embodiment, a heat release path is secured for propagating heat generated by the imaging element 59, circuit components 77 and 79, etc. to the triangular prism 55 and the signal cable 61 through the flexible substrate 57. Further, in the exemplary embodiment, another heat release path is secured for releasing the heat generated by the imaging element 59.

In FIG. 3, a flexible heat release sheet (which may be another flexible substrate than the substrate 57) 88 is pasted through a bonding material to a back surface of the flexible substrate 57 mounted with the imaging element 59. Although the heat release sheet 88 is pasted to the imaging element 59 through the substrate 57 in the exemplary embodiment, the heat release sheet 88 may be pasted directly to a back surface of the imaging element 59 if the back surface of the imaging element 59 has a site where the substrate 57 is absent. The heat release sheet 88 is folded back on a back surface side of the paper of FIG. 3, and pasted to an upper surface of a cable connection portion 73 of the substrate 57 through a bonding material. The heat release sheet 88 will be described below.

Figure 4:
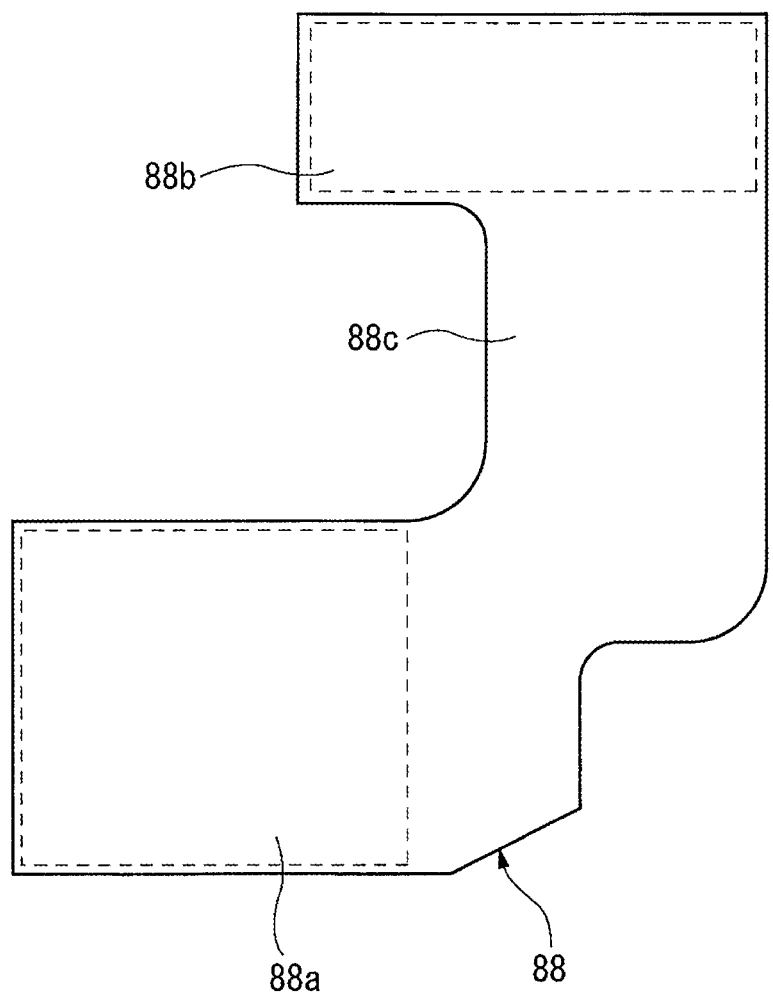
FIG. 4 is a plan view in which a heat release sheet shown in FIG. 3 is developed.

FIG. 4 is a plan view in which the heat release sheet 88 is developed. The heat release sheet 88 is constituted by a paste portion 88*a* for the back surface of the imaging element, the paste portion 88*a* serving as a region to which the back surface side of the imaging element is pasted, a paste portion 88*b* serving as a region which is pasted to the cable connection portion 73 of the substrate 57, and a bent portion 88*c* which connects the paste portion 88*a* with the paste portion 88*b*.

The paste portion 88*a* has an area large enough to allow a region corresponding to the whole back surface of the imaging element 59 to be pasted thereto. The paste portion 88*b* also has an area large enough to allow the whole surface of the cable connection portion 73 of the substrate 57 to be pasted thereto. The width of the bent portion 88*c* connecting the paste portions 88*a* and 88*b* is formed to be substantially as large as the width of the imaging element 59, so that heat propagated from the imaging element 59 can be transmitted to the paste portion 88*b* well.

The heat release sheet 88 can be bent at any place of the bent portion 88*c*. For example, the heat release sheet 88 may be bent near the paste portion 88*a* so as to extend toward the cable 61, and bent near the paste portion 88*b* so as to allow the paste portion 88*b* to cover the upper surface of the cable connection portion 73 of the substrate 57. Thus, the heat of the paste portion 88*a* can be let out to the signal cable 61 through the paste portion 88*b* and the cable connection portion 73 of the substrate 57.

Figure 5:
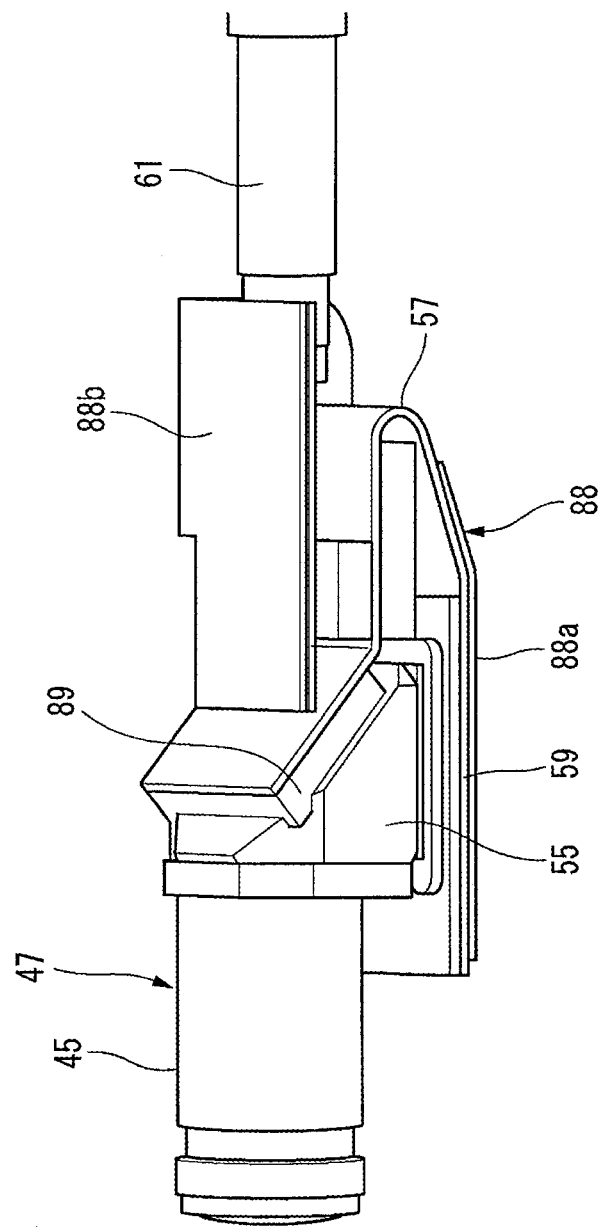
FIG. 5 is an external perspective view of only an imaging device shown in FIG. 3.

FIG. 5 is an external perspective view showing a state where only the imaging device 47 has been extracted from the endoscope front end portion 17 in the configuration of FIG. 3. The triangular prism 55 is provided in a back portion of the lens tube 45 receiving the objective lens group, and the imaging element 59 is provided on the side of the exit-side surface of the triangular prism 55. The flexible substrate 57 mounted with the imaging element 59 is bent largely and pasted to the slope of the triangular prism 55 through a bonding agent layer 89, as described previously.

The paste portion 88*a* in a lower end side of the heat release sheet 88 is pasted to the back surface side of the imaging element 59. The heat release sheet 88 is bent on the other side of the paper of FIG. 5 so that the paste portion 88*b* in an upper end side of the heat release sheet 88 is pasted to the cable connection portion 73 of the substrate 57 (see FIG. 3).

Figure 6:
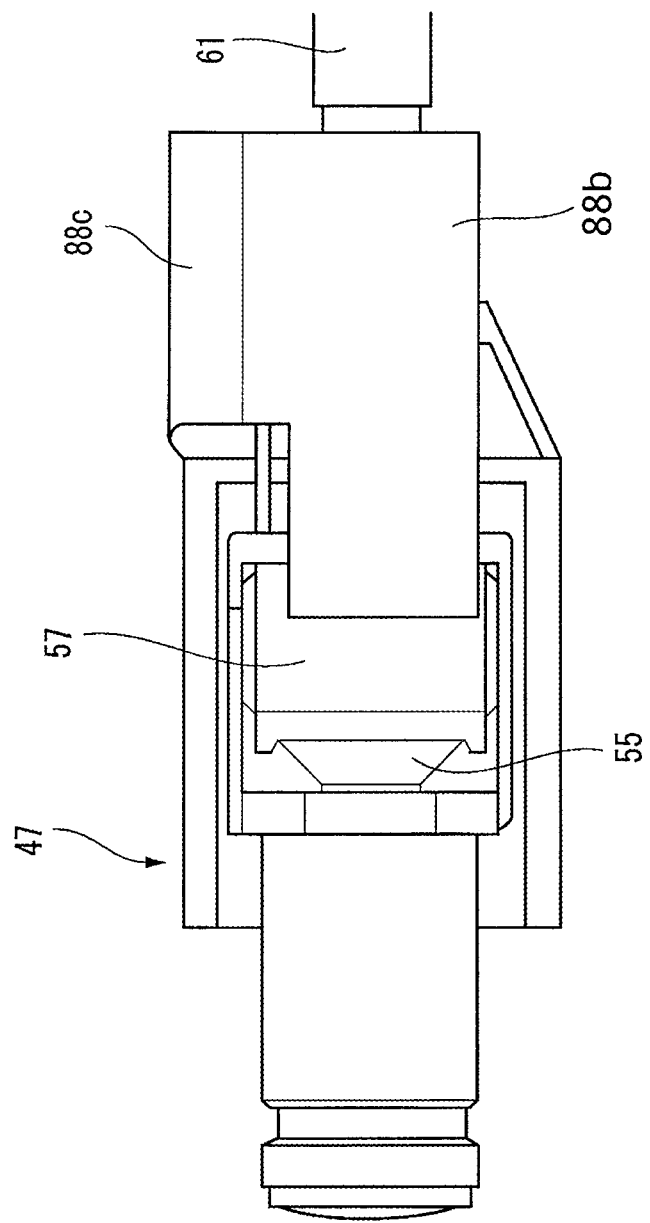
FIG. 6 is a top view of the imaging device shown in FIG. 5.
Figure 7:
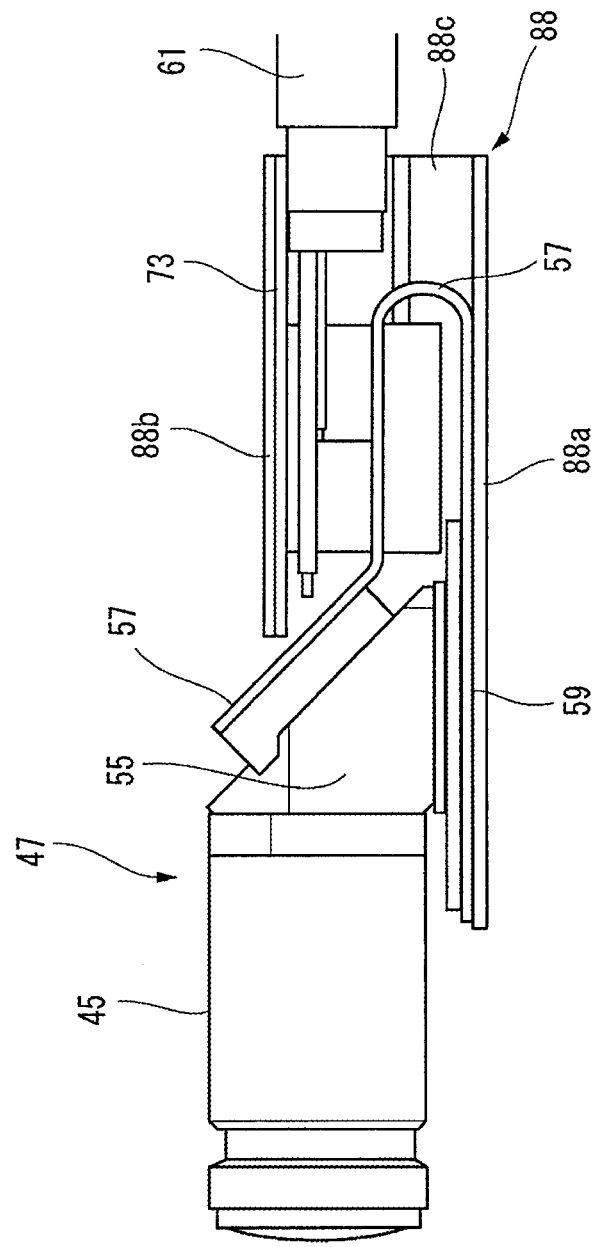
FIG. 7 is a side view of the imaging device shown in FIG. 5.
Figure 8:
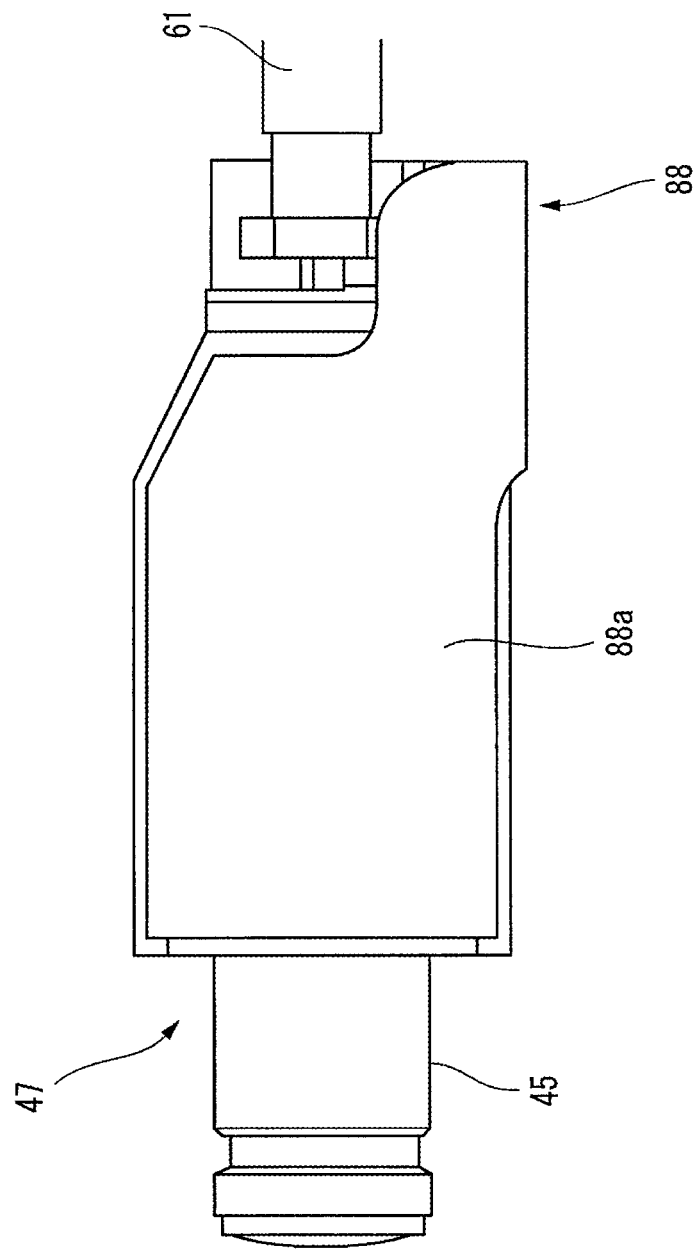
FIG. 8 is a bottom view of the imaging device shown in FIG. 5.

FIGS. 6, 7 and 8 are a top view, a side view and a bottom view of the imaging device 47 shown in FIG. 5. The heat release sheet 88 is provided to cover three surfaces, that, a bottom surface, a top surface and a side surface of members (including the triangular prism 55, the imaging element 59 and the connection portion between the substrate 57 and the signal cable 61) located between the lens tube 45 and the signal cable 61 in the imaging device 47. Since the heat release paths provided for the imaging element 59 are two paths, i.e. a path through the substrate 57 and a path through the heat release sheet 88, the heat release performance is improved. Further in this exemplary embodiment, an irregular portion of the imaging device 47 on an inner side of the heat release sheet 88 is covered with the heat release sheet 88. It is therefore easy to assemble the imaging device 47 inside the endoscope front end portion 17. In order to further improve the assembling performance, configuration may be made so that four sides including the bottom surface, the top surface and two side surfaces of the imaging device 47 are covered with the heat release sheet 88.

According to the aforementioned exemplary embodiment, there is provided an endoscope apparatus and a method for releasing heat generated by an imaging element of the endoscope apparatus, the endoscope apparatus including the imaging element which is built in an endoscope front end portion so as to receive incident light from a subject, and a flexible substrate which is mounted with the imaging element and components of a circuit for driving the imaging element and built in the endoscope front end portion, wherein: one region of a heat release sheet is pasted directly or through another member to a region of the imaging element other than a light receiving surface thereof, while another region of the heat release sheet is brought into thermal contact with a heat release member in the endoscope front end portion, so that heat generated by the imaging element can be transmitted to the heat release member.

In addition, in the endoscope apparatus and the method for releasing heat generated by the imaging element of the endoscope apparatus according to the exemplary embodiment, the thermal contact can be secured by pasting one region of the substrate to the heat release member and pasting the other region of the heat release sheet to the one region of the substrate.

In addition, in the endoscope apparatus and the method for releasing heat generated by the imaging element of the endoscope apparatus according to the exemplary embodiment, the heat release sheet is bent around the built-in substrate so as to surround the substrate.

In addition, in the endoscope apparatus and the method for releasing heat generated by the imaging element of the endoscope apparatus according to the exemplary embodiment, the heat release sheet is another flexible substrate than the substrate.

In addition, in the endoscope apparatus and the method for releasing heat generated by the imaging element of the endoscope apparatus according to the exemplary embodiment, the heat release member is a signal cable which includes a bundle of wires connected to the imaging element and the components of the circuit for driving the imaging element.

According to the exemplary embodiment described above, the heat release paths provided for the imaging element are prepared as two paths, i.e. a path through the substrate and a path through the heat release sheet, so that good heat release performance can be obtained. Thus, the driving frequency of the imaging element can be increased to improve the quality of a captured image. In addition, the number of pixels in the imaging element can be increased.

INDUSTRIAL APPLICABILITY

In an endoscope apparatus according to the invention, the performance for releasing heat of the imaging element can be improved so that the imaging element can be provided with a larger number of pixels and driven at a higher speed. Thus, the invention can be usefully applied to an endoscope apparatus intended to have a smaller diameter and a shorter length.

11 operation portion
13 endoscope insertion portion
17 front end portion
21 curved portion
23, 25 angle knob
33 forceps port
37 observation window
45 lens tube
47 imaging device
55 triangular prism
57 flexible substrate
59 imaging element
61 signal cable
73 cable connection portion of substrate
88 heat release sheet
88a paste portion to which back surface side of imaging element is pasted
88b paste portion to which cable connection portion is pasted
100 endoscope apparatus

What is claimed is:

1. An endoscope apparatus comprising:
an imaging element that is built in an endoscope front end portion;
an optical member that guides incident light from a subject to the imaging element;
a flexible substrate on which the imaging element and components of a circuit for driving the imaging element are mounted and which is built in the endoscope front end portion, wherein the flexible substrate includes two bending axes and the flexible substrate is folded back to form a U-shaped portion in one of the two bending axes and is bent in the other of the two bending axes so as to extend and contact with the optical member, wherein a region of the flexible substrate contacting with the optical member is different from a region of the flexible substrate on which the imaging element is mounted; and
a flexible heat release sheet that includes a first region attached to a given region of the imaging element other than a light receiving surface of the imaging element and a second region thermally contacted to a heat release member disposed in the endoscope front end portion,
wherein the flexible heat release sheet further includes a bend portion connecting the first region and the second region opposed to the first region and covers a top surface, a bottom surface and a side surface of the flexible substrate,
wherein the imaging element is connected to a signal cable through the U-shaped portion of the flexible substrate, and
wherein the first region of the flexible heat release sheet is separated from the flexible substrate at a position proximate to the U-shaped portion of the flexible substrate, and the flexible heat release sheet is folded back at the bend portion to at least partially surround a cable connection portion which is configured to connect the signal cable to the flexible heat release sheet.

2. The endoscope apparatus according to claim 1, wherein one region of the flexible substrate is pasted to the heat release member and the second region of the flexible heat release sheet is pasted to the one region of the flexible substrate to obtain the thermal contact between the heat release member and the flexible heat release sheet.

3. The endoscope apparatus according to claim 1, wherein the flexible heat release sheet is another flexible substrate than the flexible substrate.

4. The endoscope apparatus according to claim 1, wherein the heat release member is a signal cable which includes a bundle of wires connected to the imaging element and the components of the circuit for driving the imaging element.

5. The endoscope apparatus according to claim 1, wherein the first region is pasted directly to the given region.

6. The method according to claim 1, wherein the first bending axis is located proximate to the single cable.

7. The method according to claim 1, wherein the first bending axis is lower than the second bending axis.

8. The method according to claim 1, wherein the region of the flexible substrate contacting with the optical member and the region of the flexible substrate on which the imaging element is mounted are on a same plane of the flexible substrate.

9. A method for releasing heat generated by an imaging element of an endoscope apparatus, the endoscope apparatus including the imaging element that is built in the endoscope front end portion, an optical member that guides incident light from a subject to the imaging element and a flexible substrate on which the imaging element and components of a circuit for driving the imaging element are mounted and which is built in the endoscope front end portion, wherein the flexible substrate includes two bending axes and the flexible substrate is folded back to form a U-shaped portion in one of the two bending axes and is bent in the other of the two bending axes so as to extend and contact with the optical member, wherein a region of the flexible substrate contacting with the optical member is different from a region of the flexible substrate on which the imaging element is mounted, the method comprising:
attaching a first region of a flexible heat release sheet to a given region of the imaging element other than a light receiving surface of the imaging element;
thermally contacting a second of the flexible heat release sheet region to a heat release member disposed in the endoscope front end portion;
transmitting heat generated by the imaging element to the heat release member through the flexible heat release sheet; and
bending the flexible heat release sheet at a bend portion that connects the first region and the second region opposed to the first region, so as to cover a top surface, a bottom surface and a side surface of the flexible substrate,
wherein the imaging element is connected to a signal cable through the U-shaped portion of the flexible substrate, and
wherein the first region of the flexible heat release sheet is separated from the flexible substrate at a position proximate to the U-shaped portion of the flexible substrate, and the flexible heat release sheet is folded back at the bend portion to at least partially surround a cable connection portion which is configured to connect the signal cable to the flexible heat release sheet.

10. The method according to claim 9, wherein one region of the flexible substrate is pasted to the heat release member and the second region of the flexible heat release sheet is pasted to the one region of the flexible substrate to obtain the thermal contact between the heat release member and the flexible heat release sheet.

11. The method according to claim 9, wherein the flexible heat release sheet is another flexible substrate than the flexible substrate.

12. The method according to claim 9, wherein the flexible heat release member is a signal cable which includes a bundle of wires connected to the imaging element and the components of the circuit for driving the imaging element.

13. The method according to claim 9, wherein the first region is pasted directly to the given region.

* * * * *